United States Patent [19]

Steinau et al.

[11] Patent Number: 4,950,362
[45] Date of Patent: Aug. 21, 1990

[54] HEAT-INSULATING SHAPED FIBROUS ARTICLES AND A PROCESS FOR PRODUCING THEM

[75] Inventors: Peter Steinau, Mainz; Ludwig Wirth; Ingo Elstner, both of Wiesbaden; Andreas Naumann, Giessen-Rödgen, all of Fed. Rep. of Germany

[73] Assignee: Didier-Werke Ag, Wiesbaden, Fed. Rep. of Germany

[21] Appl. No.: 378,289

[22] Filed: Jul. 11, 1989

Related U.S. Application Data

[62] Division of Ser. No. 140,238, Dec. 31, 1987.

[30] Foreign Application Priority Data

Jan. 21, 1987 [DE] Fed. Rep. of Germany ....... 3701511

[51] Int. Cl.$^5$ ............... B29C 51/02; B29C 51/14; B32B 31/20
[52] U.S. Cl. .................................. 162/206; 156/196; 156/308.2; 156/309.9; 162/145; 162/146; 162/149; 162/159; 162/168.1; 162/175; 162/181.2; 162/181.7; 162/223; 162/224; 264/119; 264/258; 264/320; 285/397; 285/286; 285/288; 285/920; 428/283

[58] Field of Search ............... 163/145, 146, 149, 159, 163/168.1, 175, 181.2, 181.7, 206, 223, 224; 428/283, 286, 288, 301, 302; 264/119, 258, 320; 156/308.2, 309.9, 196

[56] References Cited

U.S. PATENT DOCUMENTS

| | | | |
|---|---|---|---|
| 4,101,335 | 7/1978 | Barrable | 106/99 |
| 4,378,271 | 3/1983 | Hargreaves et al. | 162/145 |
| 4,442,219 | 4/1984 | TenEyck et al. | 501/95 |

FOREIGN PATENT DOCUMENTS 2816457 11/1978 Fed. Rep. of Germany .

*Primary Examiner*—James C. Cannon
*Attorney, Agent, or Firm*—Wenderoth, Lind & Ponack

[57] ABSTRACT

Elastic, heat-insulating shapes of ceramic, refractory or fireproof fibers and, where needed, further refractory or fireproof substances, and temporary or inorganic binders, as well as a process for the preparation thereof. The heat-insulating shapes are characterized by the fact that they contain 5 to 40 weight % of fibrids comprised of organic polymers, as a result of which they have elastic properties and can be formed with ease at moderate temperatures. In preparing these shapes, a customary aqueous dispersion containing the fibers and binder is mixed with the fibrids of the organic polymer, and water is removed therefrom and the shapes are otherwise produced in a known manner.

4 Claims, No Drawings

HEAT-INSULATING SHAPED FIBROUS ARTICLES AND A PROCESS FOR PRODUCING THEM

This application is a division of Ser. No. 140,238, filed Dec. 31, 1987.

BACKGROUND OF THE INVENTION

Processes of forming heat-insulating shapes of ceramic, refractory or fireproof fibers are known. In general, an aqueous dispersion of the fibers is prepared and formed into shapes, e.g. fiber mats, by dewatering. The fiber mats, where necessary, are shaped into briquettes in further forming operations, e.g. by pressing.

Refractory or fireproof fiber shapes are taught by Unexamined West German Application DE-OS No. 34 44 397.5, which in addition to refractory and/or fireproof fibers, may also contain fine-grained and/or finely divided refractory and/or fireproof materials.

Accepted West German Specification DE-AS No. 19 47 904 also teaches that, for example, silica sol and starch, i.e. an inorganic binder and a temporary (organic) binder, can be employed.

Austrian Patent No. 379365 also teaches a process of forming non-combustible, asbestos-free boards in which 3 to 7 weight % of fibers is employed using starch and unfired plastic clay, as well as vitreous, inorganic fibers. In this process, cellulosic fibers and finely ground cellulosic fibers are mentioned in particular as organic fibers.

SUMMARY OF THE INVENTION

The present invention has as its object heat-insulating shapes of ceramic, refractory or fireproof fibers and, if desired, further refractory or fireproof substances, and a binder, which shapes possess a high degree of elasticity.

Another object of the invention is to provide a process for producing such heat-insulating shapes.

These objects are achieved by adding 5 to 40 weight % of fibrids containing an organic polymer to an aqueous dispersion containing fibers and a binder, removing water from the dispersion while forming the dispersion into a mat shape, and drying the mat shape.

DETAILED DESCRIPTION OF THE INVENTION

More particularly, in a heat-insulating shaped article comprising fibers selected from the group consisting of ceramic fibers, refractory fibers and fireproof fibers, and a binder, the present invention provides an improvement wherein the article further comprises 5 to 40 weight % of fibrids containing an organic polymer based on the weight of the article.

The fibrids employed in the present invention are known in the art, and are commercially available. Such fibrids are a fluffy, fibrous synthetic material, made of an organic polymer.

As indicated above, the heat-insulating shaped article should contain 5 to 40 weight % of the fibrids based on the weight of the article. Preferably, the content of the fibrids is 15 to 30 weight %.

In general, the fibrid content should preferably not drop below 10 weight %, because otherwise cracks may occur in the shapes, depending on the forming method, especially if strong forming procedures are applied, e.g. if shapes with small bending radii are to be made during the final forming of the fiber-mat shapes.

The heat-insulating shaped article of the present invention may also contain another refractory or fireproof substance in addition to the ceramic, refractory and fireproof fibers. According to a preferred embodiment, such other refractory or fireproof substance is vermiculite, in which case the vermiculite is present in a ratio of the fibers to the vermiculite of from 80:20 to 30:70.

The binder employed in the present invention can be either an inorganic binder, e.g. colloidal silica, or an organic binder, e.g. starch or a polyacrylate. In a preferred embodiment, the binder is colloidal silica.

As indicated above, the fibrids employed in the present invention contain or are made of an organic polymer, and are commercially available. For example, the organic polymer may be a polyolefin, e.g. polyethylene or polypropylene. According to a more particular embodiment of the invention, the fibrids are comprised of polyethylene with a softening point of 125° to 135° C., or polypropylene with a softening point of 155° to 165° C.

The process for producing the heat-insulating shaped article comprises providing an aqueous dispersion containing fibers selected from the group consisting of ceramic fibers, refractory fibers and fireproof fibers, a binder and 5 to 40 weight % of fibrids containing an organic polymer based on the dry weight of the article; removing water from the dispersion while forming the dispersion into a mat shape; and drying the mat shape.

The process of the invention is carried out in a manner known in itself, except that 5 to 40 weight %, preferably 15 to 30 weight %, of fibrids is added to the initial dispersion, such percentages being based on the weight of the dried mat shape, or the finished article which can be formed from the mat shape in a subsequent step.

According to a preferred embodiment of the invention, the fiber-mat shape, after the forming thereof, i.e. after removal of the water, can be pressed. This pressing is conducted while the temperature of the polymer is either above the softening temperature of the polymer or above the melting point of the polymer, i.e. at a temperature which will deform the fibrids.

According to another preferred embodiment, the final heat-insulating shape is formed by compression-molding of the heated fiber-mat shape. With this method, the fiber-mat shape may be heated with hot air or between hot plates, and the mat shape is subsequently formed in a cold or slightly heated mold in order to prevent the shape from adhering to the mold, and to achieve a brief residence time for the forming operation.

The final shape is distinguished in particular by its low heat conductivity, which lies especially below the heat conductivity of fiber-mat shapes with lower bulk density.

According to another embodiment, prior to the pressing and after the forming of the mat shape, the heating may be increased to 120° to 180° C. in order to bring about a temporary bonding of the individual components of the mat, either by activation of an organic binder, such as starch, or by fusing the polymer making up the fibrids.

In the process of the invention, aside from the usual starting materials in the form of ceramic or other fibers and, where needed, other refractory and/or fireproof substances, especially finely divided substances such as taught by Unexamined West German Application DE-OS No. 34 44 397.5, the aqueous dispersion prepared for the forming of the shapes also contains the fibrids comprised of organic polymers in such quantities that the dried shape contains 5 to 40 weight % of such fibrids. The forming of the fiber-mat shapes can be carried out in a known manner, e.g. on screen molds or even by allowing the aqueous suspension to settle.

In general, in these forming methods fiber-mat shapes with different thicknesses are obtained, and these thicknesses are dependent on the quantity of the dispersion running onto the screen and the water removal therefrom, and are capable of being adjusted.

Briquettes in the form of mats can then be dried in a manner known in itself, e.g., at temperatures up to 120° C. The forming into the final shapes can then be carried out either directly or also in a further processor, for which purpose such mats are heated to temperatures at which the polymer of the fibrids can be deformed, e.g. where fibrids comprised of polyethylene with a softening point of around 135° C. are used, at temperatures of 160° to 180° C., during which a pressure of 3 to 100, preferably 5 to 20, bar is advantageously applied. In general, heating to a high temperature between 160° to 180° C. must last only a few minutes, e.g. 3 to 20 minutes. This is dependent on the thickness of the mats to be formed and to be used as the briquettes.

It is also possible to form, through the contents of the fibrids in the fiber-mat shapes, shapes comprised of two briquettes. In this case, the briquettes are fused together on their contact surfaces by applying pressure for 3 minutes at the increased temperatures, e.g. at 180° C. With this embodiment, the fibrid content is preferably set at 20 to 40 weight %, based on the weight of the dried shape.

Advantageously, in the case of complex shapes the cooling is carried out by applying the mold upon the shape in order to prevent the final shape from warping.

The invention will now be described by reference to examples below.

EXAMPLE 1

3 kg ceramic fibers having a thickness of 1-3 microns and a length of 1-5 mm with a limiting application temperature of 1250° C. were evenly distributed, by means of an agitator, in a vessel containing 600 l of water. A separately prepared, approximately 3% aqueous dispersion of fibrids comprised of polyethylene with a melting point of around 135° C. was added to this dispersion. Then, while stirring, 900 g of a 40% aqueous silica sol and 150 g of an aqueous polyacrylate dispersion were added. Furthermore, a 0.2% cationic starch solution was added until a uniform flocculation had formed and the previously turbid solution had become clear. The fibrid content was 30 weight % based on the solid particles. A moist mat with a thickness of about 6 mm was formed from this dispersion by removing in vacuo, on a screen, the water of the dispersion. This mat was dried for 4 hours at a temperature of 110° C. The fiber mat, which may be called a briquette, has a bulk density of 200 mg/m$^3$ and a tensile strength of 1 N/mm$^2$ or more. This briquette was then placed in a platen press and pressed for 3 minutes at 180° C. under a pressure of 20 bar, followed by cooling in the press to 100° C., and only then was the final shaped piece, i.e. the compacted mat, removed from the mold. The thickness of the finished shape was set at 2 mm by means of spacer plates.

This 2 mm-thick shape was elastic and could be bent without breaking and without creating cracks.

EXAMPLE 2

The fiber mat, i.e. the briquette formed in accordance with Example 1, was pressed in a male/female mold into a plate under the conditions specified in Example 1, but with a 5-minute residence time in the mold, resulting in a final product free of cracks.

EXAMPLE 3

Two mats of the briquette of Example 1 were placed on each other in a press and pressure was applied under the conditions specified in Example 1, with a thickness of 3.0 mm being set for the final shape by means of spacer plates. The compacted mats were fused together after the pressing and could no longer be separated.

EXAMPLES 4-6

The mode of operation described in Example 1 was repeated, with the percentages of the fibrids being set at 5, 10, 25 and 40%. Good results were obtained in terms of shape retention, but in the batches with 5 and 10 weight % of fibrids small cracks already appeared in the shapes in forming operations using small bending radii. The higher the fibrid content, the greater the ability of the material to compact when pressure was applied at high temperatures.

EXAMPLE 7

6 kg swollen vermiculite having a particle distribution up to 2 mm, and 4 kg ceramic fibers corresponding to those of Example 1, were mixed with 750 l of water. After the addition of 4.1 kg of a 3% dispersion of fibrids and 300 g of an aqueous polyacrylate dispersion, the resultant dispersion was flocculated by the addition of a polyacrylamide solution. A fiber-mat shape was formed on a screen by removal of the water, followed by drying.

The heat-insulating shapes of the invention can be used as an insulating support layer or as sheathing, as well as an insert or filler in joints in thermal devices and pipelines. Due to their dimensional stability and excellent fit, as well as strength and elasticity, the heat-insulating shapes are suitable, for example, for the installation and retention of ceramic catalysts used in pipelines.

We claim:
1. A process for producing a heat-insulating shaped article, which comprises:
    providing an aqueous dispersion containing fibers selected from the group consisting of ceramic fibers, refractory fibers and fireproof fibers, a binder, 5 to 40 weight % of fibrids containing an organic polymer based on the dry weight of said article, and vermiculite in a ratio of said fibers to said vermiculite of from 80:20 to 30:70;
    removing water from said dispersion while forming said dispersion into a mat shape;
    heating said mat shape which is either above the softening temperature or above the melting point of the organic polymer comprising said fibrids; and
    pressing the heated mat shape into a desired shape.
2. The process according to claim 1, wherein said pressing is conducted by means of compression molding.
3. The process according to claim 1, wherein said heating is conducted at a temperature of 120 to 180° C. to bond together the components of said mat shape.
4. The process according to claim 1, wherein said binder is colloidal silica.

* * * * *